United States Patent [19]

Tanaka et al.

[11] 4,016,844
[45] Apr. 12, 1977

[54] OPERATION CONTROL SYSTEM FOR VEHICLE ENGINE

[75] Inventors: Minoru Tanaka, Chohu; Akihisa Nakamura, Tokyo; Hisakazu Fushimi, Saitama, all of Japan

[73] Assignee: Honda Giken Kogyo Kabushiki Kaisha, Tokyo, Japan

[22] Filed: July 8, 1975

[21] Appl. No.: 594,037

[30] Foreign Application Priority Data

July 10, 1974 Japan .............................. 49-78211
July 17, 1974 Japan .............................. 49-81148

[52] U.S. Cl. ........................ 123/117 A; 123/117 R
[51] Int. Cl.² ........................................ F02P 5/02
[58] Field of Search ..... 123/117 A, 117 R, 145.6 A

[56] References Cited
UNITED STATES PATENTS

| | | | |
|---|---|---|---|
| 2,016,094 | 10/1935 | Mallory | 123/117 A |
| 3,272,191 | 9/1966 | Walker | 123/117 A |
| 3,584,521 | 6/1971 | Tooker et al. | 123/117 AX |
| 3,650,253 | 3/1972 | Cooksey | 123/117 A |
| 3,871,341 | 3/1975 | Kalogerson et al. | 123/117 AX |
| 3,896,913 | 7/1975 | Maruoka et al. | 123/117 RX |
| 3,913,540 | 10/1975 | Hayashi | 123/117 A |
| 3,923,023 | 12/1975 | Ito et al. | 123/117 A |

*Primary Examiner*—C. J. Husar
*Assistant Examiner*—Tony M. Argenbright
*Attorney, Agent, or Firm*—Lyon & Lyon

[57] ABSTRACT

A spark advance and retard system for an automobile engine advances the spark timing when the automobile is cruising, and retards the spark timing when the automobile is idling, accelerating or decelerating. A device which detects cruising of the automobile employs three electrical switches connected in series: the first is opened by actuation of the automobile brake pedal, the second is closed by actuation of the accelerator pedal, and the third is closed by high vacuum conditions in the engine intake system. When all three switches have been closed for a predetermined time interval, a timer device actuated electrically controlled valves to cause a pneumatic operator to advance the spark timing.

3 Claims, 2 Drawing Figures

OPERATION CONTROL SYSTEM FOR VEHICLE ENGINE

This invention relates to control of engine powered vehicles and is particularly directed to apparatus for ignition timing control of an internal combustion engine used to power an automobile. The object of the invention is to improve fuel consumption by automatically advancing the ignition timing when the automobile is "cruising", that is, when the automobile is driving at a normal rate of speed on a highway, as contrasted to city driving involving many accelerations and decelerations, and idling. In such city driving it is essential to retard the ignition timing in order to minimize discharge of pollutants in the exhaust gases of the engine. This object is accomplished by providing a cruise detector which operates after the vehicle has maintained a steady speed for a predetermined time interval. The cruise detector then energizes electrically operated control valves to cause a pneumatic actuator to advance the spark by moving the ignition system breaker plate through a predetermined angle. Since the exhaust emissions are relatively less harmful during the approximately steady state operation of cruising, the ignition timing may be advanced in order to reduce fuel consumption. Thus, the fuel economy is improved for suburban driving while discharge of pollutants in the exhaust gases is maintained at an acceptable low level during city driving.

The cruise detector device employs three electrical switches and a timer device. The first switch is closed when the brake pedal is not actuated, the second switch is closed when the accelerator pedal is actuated, and the third switch is closed when the engine intake vacuum intensity is high. When all three switches have been closed for a predetermined time interval, the timer device energizes electrically operated control valves to cause a pneumatic actuator to swing the breaker plate in a direction to advance the spark timing. When any one of the three electric switches is opened by reason of operation of the vehicle brake, release of foot pressure from the accelerator pedal, or drop off in engine intake vacuum intensity, the output signal from the timer causes the electrically operated control valves to cause the pneumatic actuator to retard the spark timing.

Other and more detailed objects and advantages will appear hereinafter.

Figure 1:
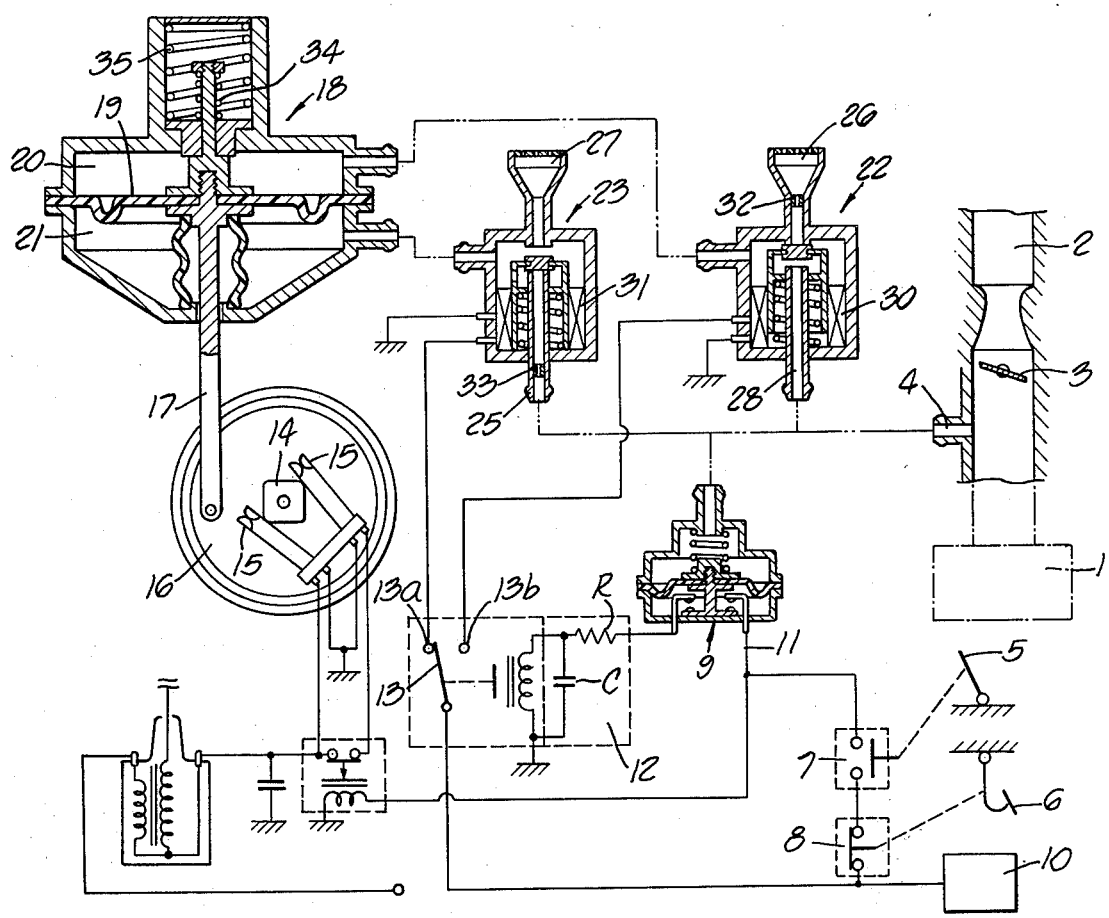
FIG. 1 is a schematic diagram showing a preferred embodiment of this invention.

Referring to the drawings, the internal combustion spark ignition engine 1 is connected to drive a vehicle, not shown. An intake passage 2 connected to the engine 1 contains a throttle valve 3, and a vacuum port 4 is connected to the intake passage 2 downstream from the throttle valve 3. An accelerator pedal 5 mounted in the automobile is connected by means, not shown, to operate the throttle valve 3. A brake pedal 6 is also mounted in the automobile for operating the brakes thereof. A normally closed electric switch 8 is opened when the brake pedal 6 is depressed. A normally open electric switch 7 is closed when the accelerator pedal 5 is depressed. A third electric switch 9 is normally opened by a spring but is held in closed position whenever the vacuum intensity in the intake passage 2 downstream from the throttle valve exceeds a predetermined intensity. These three switches 7, 8 and 9 are connected in series in an electrical circuit 11 connected to a power source 10. A timer device 12 having a capacitor C and a resistance R operates electromagnetically to swing the timer switch 13 between the contact 13a and the contact 13b.

The timing rotor 14 is geared to turn in synchronism with the engine cam shaft, not shown, and serves to operate the pairs of breaker points 15. These operate conventional apparatus to cause the engine spark plugs to fire in proper sequence. The ignition timing is controlled by turning the breaker point plate 16 for a few degrees in either direction. This is accomplished by means of a rod 17 forming part of a pneumatic actuator 18. The rod is fixed to the center of a flexible diaphragm 19 which separates the upper chamber 20 from the lower chamber 21. The upper chamber 20 is connected to the control valve 22, and the lower chamber 21 is connected to the control valve 23. Each of these valves includes an electrically operated solenoid, and each is adapted to connect its respective chamber to atmospheric air pressure when it is electrically energized, and to connect such chamber to engine vacuum pressure when it is not. Thus, the solenoid 30 when energized through switch 13 and contact 13b acts to close off the tube 28 leading to the vacuum port 4 and to connect upper chamber 20 to atmosphere through air intake 26 and restriction 32. Similarly, when solenoid 31 is energized through switch 13 and contact 13a, the control valve 23 closes off communication through tube 25 and restriction 33 to the vacuum port 4, and connects the lower chamber 21 to the air intake 27. A spring 34 resists downward movement of the diaphragm 19 and a spring 35 resists upward movement of the diaphragm 19. The restrictions 32 and 33 insure that the changeover of operation to advance the ignition timing occurs slowly and not abruptly.

Figure 2:
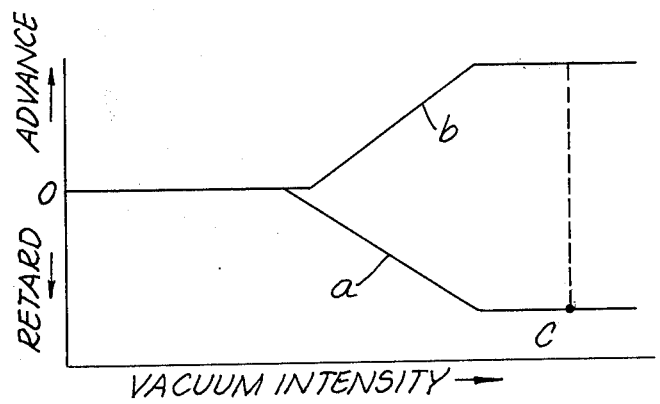
FIG. 2 is a graph showing the relationship of ignition timing and engine intake vacuum intensity.

As shown in the diagram of FIG. 2, upward movement of the diaphragm 19 retards the ignition timing gradually along line a. Downward movement of the diaphragm 19 causes the ignition timing to advance along line b. The letter c indicates a relatively high intake vacuum during cruising.

In operation, during city driving of the vehicle, the cruise detector comprising switches 7, 8 and 9 remains at rest, with no current in circuit 11, and the timer switch 13 engages the contact 13a. This energizes the control valve 23 which opens the air intake 27 and closes the vacuum line to the vacuum port 4. The control valve 22, which remains de-energized, closes the air intake 26 and opens the vacuum line through tube 28. Accordingly, atmospheric air pressure exists in the lower chamber 21 and vacuum pressure from the engine intake exists in upper chamber 20. The diaphragm 19 moves upward, causing the rod 17 to move the breaker point plate 16 in a clockwise direction, as viewed in FIG. 1. This retards the ignition timing.

If the operation of the vehicle should turn to cruising, the electric switches 7, 8 and 9 close to cause current to flow in circuit 11, and after a predetermined time interval the timer device 12 energizes a solenoid to swing the timer switch 13 away from the contact 13a and into engagement with the contact 13b. The control valve 22 opens the air intake 26 and the control valve 23 opens the tube 25. The upper chamber 20 is pressurized at atmospheric pressure, and the lower chamber is subjected to intake vacuum pressure. The rod 17 moves downward to cause counterclockwise movement of the breaker point plate 16. This action advances the ignition timing.

Having fully described our invention, it is to be understood that we are not to be limited to the details herein set forth, but that our invention is of the full scope of the appended claims.

We claim:

1. In a spark ignition timing control system for an internal combustion engine driving a vehicle, the engine having an intake passage, a throttle valve in the intake passage, and a distributor having a movable spark adjusting member, the vehicle having a brake actuator and having a throttle control member for the engine, the improvement comprising, in combination: a cruising detector serving to detect cruising of the vehicle, said detector including a first electrical switch opened by actuation of the brake actuator, a second electrical switch closed by actuation of the throttle control member, a third electrical switch closed by a strong vacuum condition in the intake passage downstream from the throttle valve, and time delay means, all three said switches and said time delay means being connected in series, said cruising detector being operated after all three said switches have been closed for a predetermined time interval, and means responsive to operation of said cruising detector to cause the movable spark adjusting member to advance the spark.

2. In a spark ignition timing control system for an internal combustion engine driving a vehicle, the engine having an intake passage, a throttle valve in the intake passage, and a distributor having a movable spark adjusting member, the vehicle having a brake actuator and having a throttle control member for the engine, the improvement comprising, in combination: means for adjusting the movable spark adjusting member, said means having at least a pneumatic chamber, a control valve being electrically operated and acting in one position to connect said pneumatic chamber to the intake passage downstream from the throttle valve and acting in another position to connect said pneumatic chamber to atmospheric pressure, the movable spark adjusting member being advanced when said pneumatic chamber is connected to the intake passage downstream from the throttle valve, a cruising detector serving to detect cruising of the vehicle, said cruising detector including a first electrical switch opened by actuation of the brake actuator, a second electrical switch closed by actuation of the throttle control member, a third electrical switch closed by a strong vacuum condition in the intake passage downstream from the throttle valve, and time delay means, all three said switches and said time delay means being connected in series, said cruising detector being operated after all three said switches have been closed for a predetermined time interval, and a relay responsive to operation of said cruising detector to energize said control valve to move to said one position.

3. In a spark ignition timing control system for an internal combustion engine driving a vehicle, the engine having an intake passage, a throttle valve in the intake passage, and a distributor having a movable spark adjusting member, the vehicle having a brake actuator and having a throttle control member for the engine, the improvement comprising, in combination: means for adjusting the movable spark adjusting member, said means having first and second chambers separated by a flexible diaphragm, a first control valve being electrically operated and acting in one position to connect said first chamber to the intake passage downstream from the throttle valve, and acting in another position to connect said first chamber to atmospheric pressure, a second control valve being electrically operated and acting in one position to connect said second chamber to the intake passage downstream from the throttle valve, and acting in another position to connect said second chamber to atmospheric pressure, the movable spark adjusting member being advanced when said first chamber is connected to the intake passage downstream from the throttle valve and said second chamber is connected to atmospheric pressure, a cruising detector serving to detect cruising of the vehicle, said cruising detector including a first electrical switch opened by actuation of the brake actuator, a second electrical switch closed by actuation of the throttle control member, a third electrical switch closed by a strong vacuum condition in the intake passage downstream from the throttle valve, and time delay means, all three said switches and said time delay means being connected in series, said cruising detector being operated after all three said switches have been closed for a predetermined time interval, and a relay responsive to operation of said cruising detector to energize said first control valve to move to said one position and to de-energize said second control valve to move to said other position.

* * * * *